Sept. 22, 1964　　　K. W. REILLY　　　3,149,883
PROTECTIVE HUB CLOSURE
Filed April 16, 1962
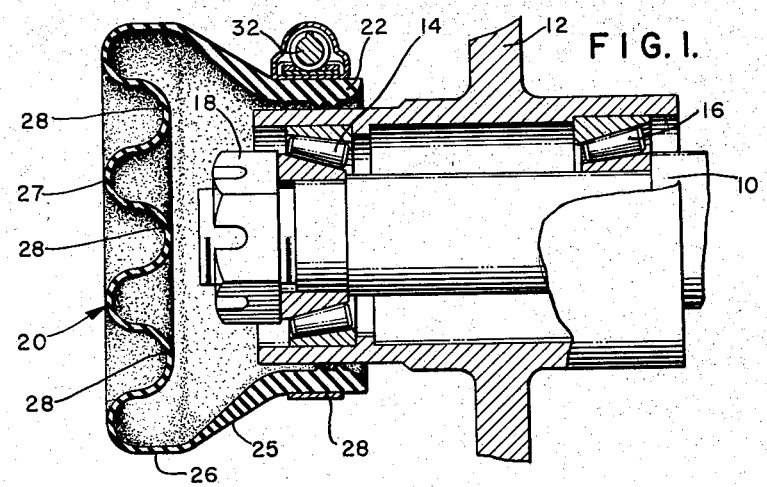
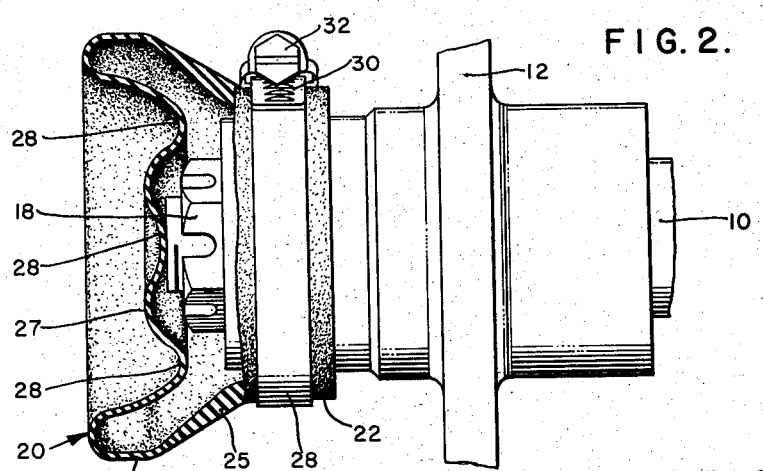
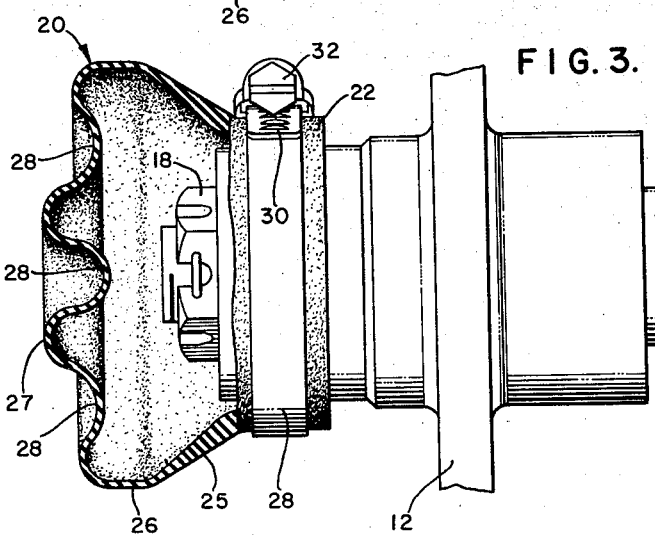
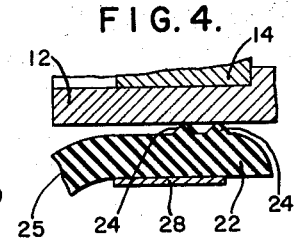
INVENTOR.
KENNETH W. REILLY
BY
*Lyon & Lyon*
ATTORNEYS.

3,149,883
PROTECTIVE HUB CLOSURE
Kenneth W. Reilly, 7827 Dunbarton Ave.,
Los Angeles, Calif.
Filed Apr. 16, 1962, Ser. No. 187,851
3 Claims. (Cl. 301—108)

This invention relates to a hub closure.

In the launching of small boats, same are frequently mounted upon a boat trailer which is backed into the water to a level wherein the boat may be pushed off the trailer into the water, or the reverse. During this launching the axle of the trailer is submerged.

It is an object of this invention to provide a device for protecting the axle, its bearings, seals and the like, from exposure to water.

Still a further object of this invention is to provide such a device which is readily and easily attached to the wheel hub in such a manner so as to avoid any interference with the rotation thereof.

Still a further object of this invention is to provide a structure which will compensate for varying pressure therein to lengthen the life expectancy thereof.

Still a further object of this invention is to utilize the water pressure which would normally cause water to enter the hub to create a sufficient air pressure within the hub to exclude entry of water.

Other objects and advantages will be readily apparent from the following description.

In the drawings:

FIGURE 1 is a side elevation with parts thereof broken away illustrating this invention at rest.

FIGURE 2 is a view similar to FIGURE 1 with the device in a compressed position.

FIGURE 3 is a similar view with the device in an expanded position.

FIGURE 4 is a fragmentary view of the hub seal.

Referring now to the drawings, one end of an axle 10 of a boat trailer is illustrated projecting into wheel hub 12 and supported therein by bearings 14 and 16. A nut 18 on the threaded extremity of the axle secures the wheel hub in place.

The above structure is conventional and it is to be noted that the usual hub cap or grease cups have been removed.

The hub closure 20 is formed of natural or synthetic rubber or other suitable flexible relatively inert material and has a ring 22 formed at one extremity which snugly fits over the outermost extremity of hub 12. A pair of annular internal ridges 24 and 26 bear against the hub 12 forming a fluid tight seal when the clamp 28 is tightened. The clamp in this embodiment is a metal strap having a series of slots 30 therein and a threaded screw 32 which when turned, expands or contracts the strap, such a clamp being well known to those skilled in the art.

From the relatively thick walled ring 22 the closure flares outwardly as at 24 and tapers to a thin flexible wall as at 26. The outermost wall 27 of the closure has a series of convolutions 28 formed therein forming alternate valleys and ridges in cross section. The convolutions are so shaped that no part thereof is a straight line. The number of such convolutions may be varied of course, and result in an easily flexed outer wall for the closure.

When the wheel hub is immersed in cold water for example, the air trapped therein will contract and the wall will contract to a compressed state as seen in FIGURE 2 until a condition of equal pressure on each side thereof has been obtained. Likewise when the trailer is being hauled along the highway and thus subject to heat, the air inside the closure will expand flexing wall 27 outwardly until a balanced pressure condition exists as seen in FIGURE 3.

While what hereinbefore has been described as the preferred embodiment of this invention, it is readily apparent that modifications and alterations can be made without departing from the scope of the invention.

I claim:

1. A closure device for a wheel hub rotatably mounted upon an axle comprising: a closure member of flexible inert material having a ring for sealingly engaging said hub, a thin outer wall spaced from said ring having a series of convolutions therein permitting flexing of said wall to equalize the pressure on either side thereof, said ring being substantially thicker than the wall, and a flared tapered section connecting said ring and said wall.

2. A closure device for a wheel hub rotatably mounted upon an axle comprising: a closure member of flexible inert material having a ring adapted to fit said hub, a thin outer wall spaced from said ring having a series of convolutions therein permitting flexing of said wall to equalize the pressure on either side thereof, said convolutions formed so that no part of said wall is a straight line, said ring being substantially thicker than the wall, and a flared tapered section connecting said ring and said wall.

3. A closure device for a wheel hub rotatably mounted upon an axle comprising: a closure member of flexible inert material having a ring adapted to fit said hub, a thin outer wall spaced from said ring having a series of convolutions therein permitting flexing of said wall to equalize the pressure on either side thereof, said convolutions formed so that no part of said wall is a straight line, said ring being substantially thicker than the wall, a flared tapered section connecting said ring and said wall, and a pair of spaced annular internal ridges formed on said ring.

References Cited in the file of this patent

UNITED STATES PATENTS

| | | |
|---|---|---|
| Re. 24,940 | Stephens | Feb. 28, 1961 |
| 1,484,141 | Mallory | Feb. 19, 1924 |
| 2,069,343 | White | Feb. 2, 1937 |
| 2,657,104 | Kayser | Oct. 27, 1953 |
| 2,698,766 | Cox | Jan. 4, 1955 |
| 3,003,834 | Pendleton | Oct. 10, 1961 |

FOREIGN PATENTS

| | | |
|---|---|---|
| 565,074 | Canada | Oct. 21, 1958 |
| 159,862 | Great Britain | Mar. 30, 1922 |